(12) United States Patent
Paulsen et al.

(10) Patent No.: US 12,456,276 B2
(45) Date of Patent: Oct. 28, 2025

(54) INTRAOPERATIVE STEREOVISION-BASED VERTEBRAL POSITION MONITORING

(71) Applicant: The Trustees of Dartmouth College, Hanover, NH (US)

(72) Inventors: Keith D. Paulsen, Hanover, NH (US); Xiaoyao Fan, Hanover, NH (US); William R. Warner, Memphis, TN (US)

(73) Assignee: The Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 18/840,030

(22) PCT Filed: Feb. 21, 2023

(86) PCT No.: PCT/US2023/013527
§ 371 (c)(1),
(2) Date: Aug. 20, 2024

(87) PCT Pub. No.: WO2023/158878
PCT Pub. Date: Aug. 24, 2023

(65) Prior Publication Data
US 2025/0111632 A1    Apr. 3, 2025

Related U.S. Application Data

(60) Provisional application No. 63/312,370, filed on Feb. 21, 2022.

(51) Int. Cl.
*G06T 19/20* (2011.01)
*A61B 34/10* (2016.01)
(Continued)

(52) U.S. Cl.
CPC .............. *G06T 19/20* (2013.01); *A61B 34/10* (2016.02); *A61B 90/361* (2016.02); *A61B 90/37* (2016.02);
(Continued)

(58) Field of Classification Search
CPC ....... A61B 34/10; A61B 90/361; A61B 90/37; A61B 2090/3762; A61B 2090/371;
(Continued)

(56) References Cited

U.S. PATENT DOCUMENTS 11,406,471 B1 * 8/2022 Paulsen ................ A61B 90/361
2013/0173240 A1 * 7/2013 Koell ..................... G06F 30/20
703/2

(Continued)

OTHER PUBLICATIONS

International Search Report and Written Opinion in corresponding International Patent Application No. PCT/US23/13527, mailed May 17, 2023, 17 pages.

*Primary Examiner* — Sing-Wai Wu
(74) *Attorney, Agent, or Firm* — Cozen O'Connor

(57) ABSTRACT

An intraoperative stereovision system has a stereo imager configured to provide stereo images at first and second time (iSV0, iSV(n)) to an image processor configured with a computerized mechanical model of a spinal column, the computerized mechanical model configured to model vertebrae as rigid, displaceable, bodies. The image processor is configured to extract an iSV0 surface model from iSV0 and an iSV(n) surface model from the iSV(n); to register these surfaces, and identify differences therefrom. The image processor is configured to adjust the computerized mechanical model according to the identified differences thereby causing the adjusted computerized mechanical model to track the iSV(n) surface model at each of multiple timepoints.

16 Claims, 7 Drawing Sheets

(51) Int. Cl.
   *A61B 90/00*   (2016.01)
   *G06T 7/00*    (2017.01)
   *G06T 7/33*    (2017.01)
(52) U.S. Cl.
   CPC ............ *G06T 7/0014* (2013.01); *G06T 7/344* (2017.01); *A61B 2034/105* (2016.02); *A61B 2090/371* (2016.02); *A61B 2090/374* (2016.02); *A61B 2090/3762* (2016.02); *G06T 2207/10012* (2013.01); *G06T 2207/10081* (2013.01); *G06T 2207/10088* (2013.01); *G06T 2207/20212* (2013.01); *G06T 2207/30012* (2013.01); *G06T 2210/41* (2013.01); *G06T 2219/2021* (2013.01)
(58) Field of Classification Search
   CPC . G06T 2207/10012; G06T 2207/10088; G06T 2207/30012; G06T 2210/41; G06T 2219/2021
   See application file for complete search history.

(56) References Cited

U.S. PATENT DOCUMENTS

| | | | |
|---|---|---|---|
| 2019/0103190 A1* | 4/2019 | Schmidt | G16H 50/50 |
| 2020/0053335 A1 | 2/2020 | Casas | |
| 2021/0121237 A1 | 4/2021 | Fanson et al. | |
| 2021/0192763 A1 | 6/2021 | Liu et al. | |

\* cited by examiner

A Accessory Process
B Mammillary Process
C Spinous Process
D Lamina
E Traverse Process
F Pedicle
G Disc Space
H Vertebral Body
I Spinal Column Superior view of spine vertebral body. On this diagram are a number of boney surface features that are detectable during a stereovision acquisition. The features include A, B, C, D, E

# INTRAOPERATIVE STEREOVISION-BASED VERTEBRAL POSITION MONITORING

CROSS-REFERENCE TO RELATED APPLICATIONS

This application is a U.S. National Phase Application of PCT/US2023/013527 filed Feb. 21, 2023, which claims priority to U.S. Provisional Application No. 63/312,370 filed Feb. 21, 2022, both of which are hereby incorporated in their entirety.

GOVERNMENT RIGHTS

This invention was made with government support under grant no. R01EB025747 awarded by the National Institutes of Health. The government has certain rights in the invention.

BACKGROUND

Spinal stabilization and fusion surgeries are common, being performed for conditions ranging from scoliosis and kyphosis to painful ruptured disks and fracture repair.

Preoperative CT (pCT) images acquired in a supine position can be inaccurate for intraoperative image guidance in open spine surgery due to alignment change between supine pCT and intraoperative prone positioning, plus, when performing such surgery, the subject's body and vertebral alignment is moved throughout the process of installing hardware known as instrumentation. This movement during surgery is a reason why even initial intraoperative CT (iCT) taken at the beginning of a surgery becomes inaccurate for guidance as intervertebral motion occurs during the course of surgery. Indeed, alteration of alignment of vertebrae from a pathological alignment toward a more "normal" alignment is the purpose of surgical treatment of scoliosis and kyphosis, and restoration of a normal alignment is often desirable during surgical repair of spinal fractures. Repeat CT during surgery is undesirable because it can lead to excessive radiation exposure to both subject, surgeon, and staff.

Alteration of vertebral alignment during surgery, however, has potential to compress, obstruct blood supply to, or otherwise damage, the spinal cord in and nerve roots that exit the spinal cord through intervertebral spaces—such compression or damage can result in life-altering paralysis or chronic pain. In order to prevent paralysis or chronic pain it is desirable to ensure the nerve channels of adjacent vertebrae remain sufficiently well aligned and intervertebral spaces remain sufficiently wide that nerve damage is avoided. It is also desirable to restore a normal curvature to the spine while correcting as much as possible abnormal spinal curvature such as scoliosis.

Further, it is desirable to ensure hardware, such as pedicle screws and rods, and interbody implants if used, is accurately placed with adequate bone surrounding screws so they do not break through bone or compromise other surrounding tissue. For example, a pedicle screw placed too close to, or at a wrong angle with respect to, the spinal nerve canal leading to a medial breach during placement can result in complications such as cerebro-spinal fluid leakage or, if the spinal cord is damaged, paralysis. Accurate placement helps avoid damage to spinal nerves and nerve roots, as well as avoiding damage to, or obstruction of, crucial arteries that feed those nerves.

SUMMARY

An intraoperative stereovision system has a stereo imager configured to provide stereo images at first and second time (iSV0, iSV(n)) to an image processor configured with a computerized mechanical model of a spinal column, the computerized mechanical model configured to model vertebrae as rigid, displaceable, bodies. The image processor is configured to extract an iSV0 surface model from iSV0 and an iSV(n) surface model from the iSV(n); to register these surfaces and identify differences therefrom. The image processor is configured to adjust the computerized mechanical model according to the identified differences thereby causing the adjusted computerized mechanical model to track the iSV(n) surface model at each of multiple timepoints.

DETAILED DESCRIPTION OF THE EMBODIMENTS

We have created a system 100 that models motion induced in the spine during surgical procedures. This system is intended for use during repair of fractures, during correction surgeries for scoliosis, during disk replacement and spinal fusion procedure, and other surgeries. In cases where spinal correction is performed (e.g., scoliosis procedures or restoration of disc height and of lordosis) the system monitors the degree of correction by tracking the motion that is induced to the spine during the correction procedure. This equates to monitoring the changes in spinal poses and the degree of correction that occurs from the start of surgery to the end of surgery.

Figure 1:
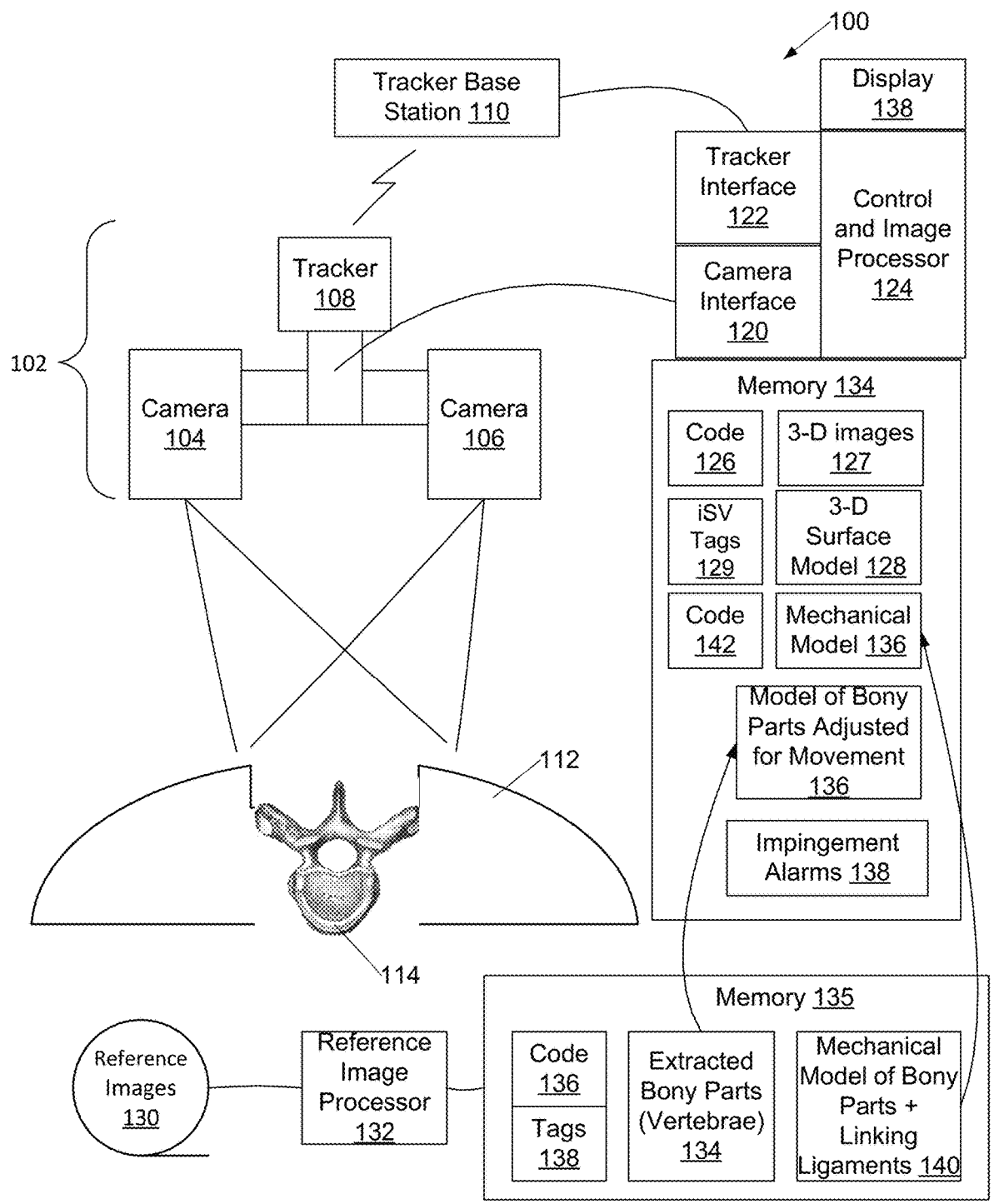
FIG. 1 is a schematic block diagram of an embodiment of a system configured to monitor vertebral position and alignment during spinal surgery.

The system 100 (FIG. 1) for monitoring vertebral position and alignment during spinal surgery includes a calibrated stereo-vision unit 102. In embodiments, stereo-vision unit 102 includes two or more cameras, including first camera 104 and second camera 106, with lenses spaced apart. In a particular embodiment, one or more trackers 108 are physically coupled to cameras of the stereo-vision unit 102 either as camera pairs (as shown in FIG. 1). In another embodiment, trackers are attached to cameras individually to permit tracking camera locations since tracked camera locations can aid three-dimensional surface extraction from stereo images. In a particular embodiment, the stereo-vision unit is handheld and may be positioned over a surgical wound to observe a surgical wound.

In alternative embodiments, cameras of stereo vision unit 102 may be fixed in place. In some embodiments, the stereo-vision unit 102 may have two cameras. In other embodiments the stereo-vision unit may have multiples greater than two such as four cameras, or more than four cameras, and a processor may stitch images from the multiple cameras prior to extraction of a three-dimensional surface from the multiple cameras.

Where a mobile, portable or handheld stereo-vision unit 102 with tracker is used, a tracking base station 110 tracks location of stereo-vision unit 102 through tracker 108.

The stereo-vision unit 102 is adapted to image a subject 112 undergoing open spinal surgery with ligaments and other tissues associated with vertebrae 114 of the spinal column exposed for spinal surgery. In some embodiments, the subject is in prone position during surgery with ligaments and other tissues exposed through the subject's back, these embodiments may provide access to lumbar, thoracic, and/or cervical spine as necessary for planned surgery. In other embodiments the subject is in supine position with exposure of lumbar spine being through the abdomen.

Stereo-vision unit 102 couples wirelessly or through wires through a camera interface 120 to a control and image processor 124.

Tracking base station 110 and tracker couples through a tracker interface and/or tracker 108 couple wirelessly or through wires and a tracker interface 122 to run-time image processor 124.

Image processor 124 is configured to extract a three-dimensional point cloud from images captured by the stereo-vision unit 102 and to construct a three-dimensional surface model therefrom.

Figure 2A:
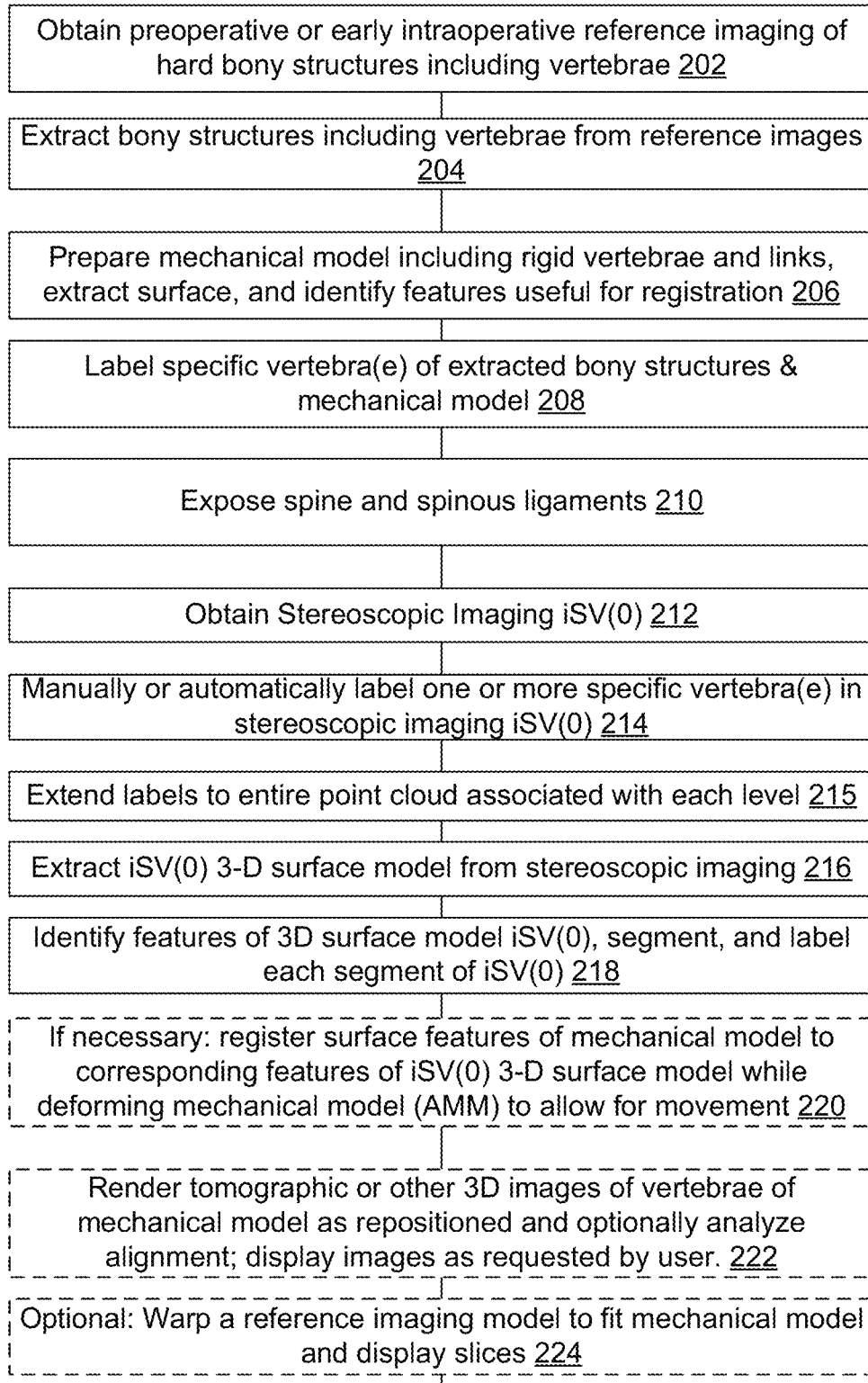
FIGS. 2A and 2B are a flowchart illustrating a method of providing imagery to a surgeon to improve spinal surgical operations that uses the system of FIG. 1.
Figure 2B:
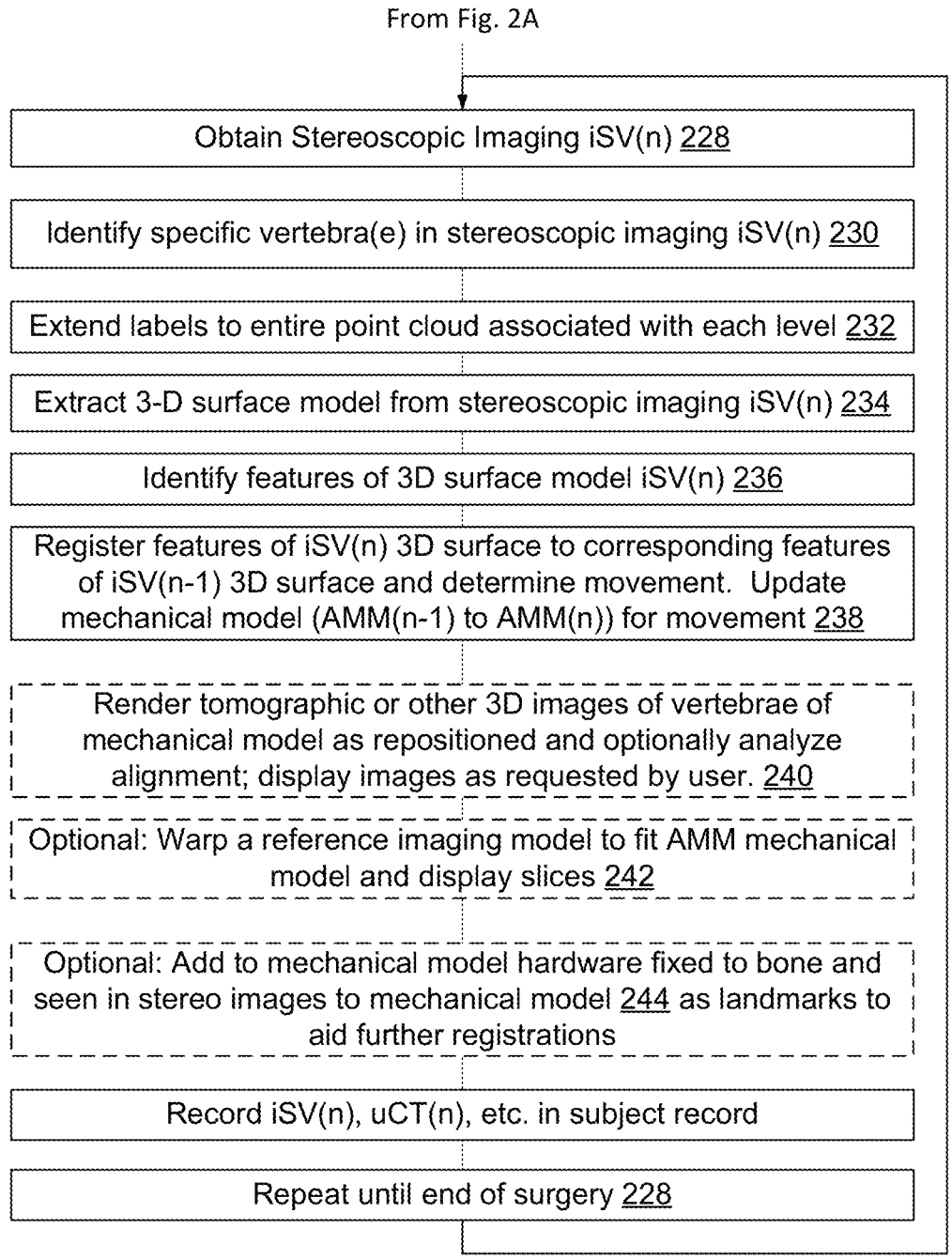
Figure 5:
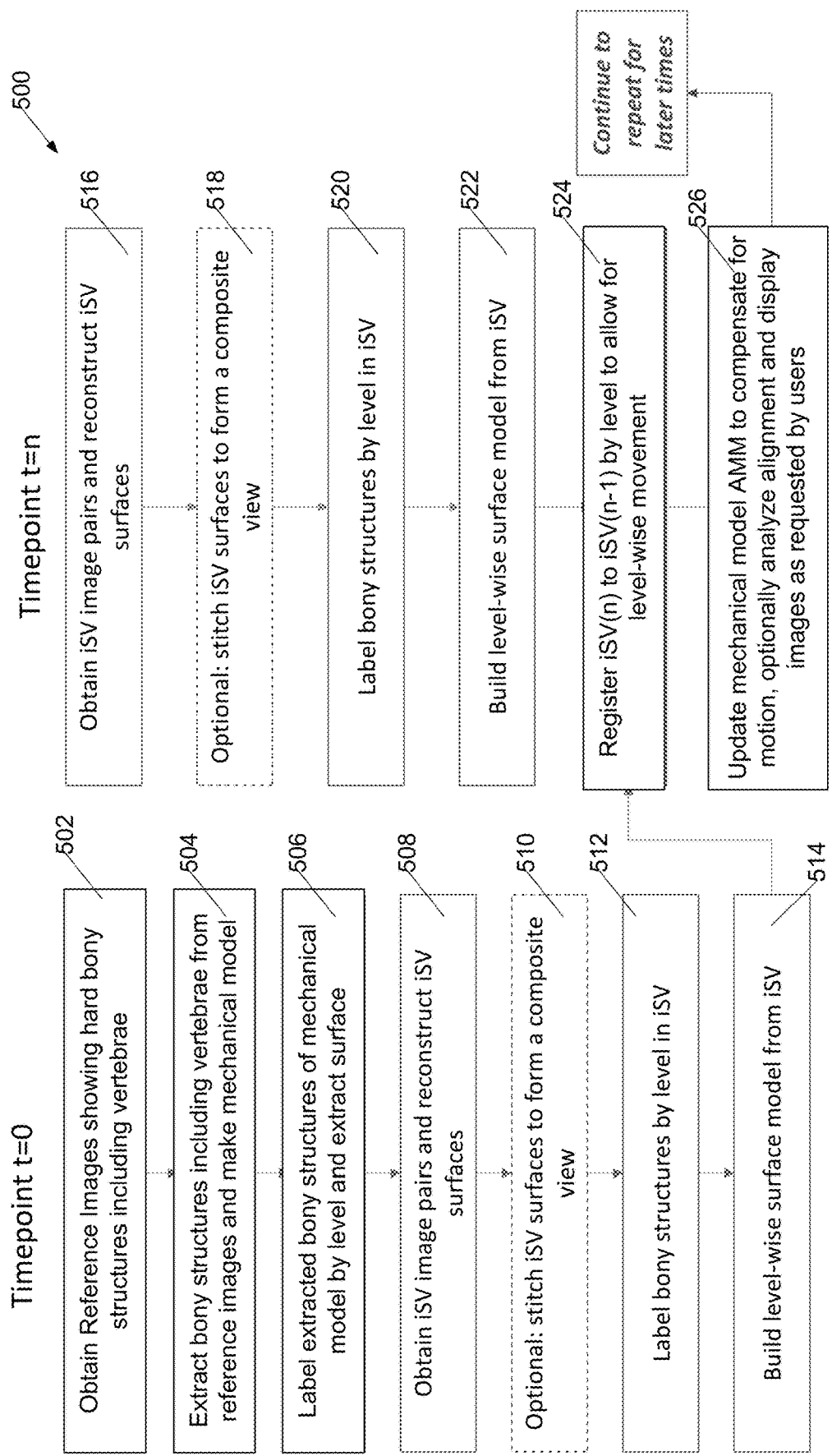
FIG. 5 is a flowchart illustrating a particular embodiment of a method for registration of reference images such as preoperative or intraoperative computed tomography imaging to intraoperative stereovision images via a surface-model to surface-model registration.

With reference to FIGS. 2 and 5 as well as FIG. 1, the method 500 begins with obtaining 202, 502 reference images 130, prior to surgery or early during surgery, such as preoperative or early intraoperative magnetic resonance (MRI) images, preoperative computerized X-ray tomography (pCT) images, or early intraoperative computerized X-ray tomography (iCT) images. These obtained reference images are loaded into an image processor 132. In a particular embodiment the reference images are iCT images obtained early in surgery with an O-Arm (trademark of Medtronic) mobile imaging system after the subject has been positioned for surgery. These reference images are preferably three-dimensional (3D) tomographic images of the subject, including the subject's spine, obtained with the subject positioned in a same or similar position to an initial position of the subject during surgery. In some embodiments, fiducials visible in reference images may be positioned at predetermined locations along the subject's spine to aid registration.

Reference image processor 132 is configured by code 136 in memory 135 to extract 204 504 bony parts 134, such as and including vertebrae and in some embodiments sacrum, from reference images 130, and to prepare a computerized mechanical model 140 within which the bony structures are represented as rigid objects that in some embodiments are connected together by flexible couplings representing soft tissues such as ligaments. These bony structures are then labeled 506, in some embodiments one or more reference labels or tags 138 may be manually entered 208 to identify a particular shape in the reference images as representing one or more specific vertebrae, in alternative embodiments reference images extend to the sacrum or other easily and automatically recognizable landmarks and labeling specific vertebrae is performed automatically. In another embodiment, once an initial label is entered on one vertebra in the reference images, remaining vertebrae are automatically labeled based on that initial label and separation between the bony structures.

Surgery begins 210 by exposing those portions of the spine and spinous ligaments upon which surgery is to be performed.

Upon exposure, and at intervals thereafter, intraoperative stereoscopic imaging (iSV) is obtained 212, 508 using stereo imager 102. In some embodiments stereo imager 102 obtains 3D images covering the entire area of interest of spinal column exposed for surgery field, and in other embodiments surgery-time or run-time image processor 124 is configured by code 126 in memory 125 to stitch 510 multiple images obtained by the stereo imager together, overlapping and combining them as needed to cover the entire area of interest of spinal column exposed for surgery as 3D images 127.

In a particular embodiment, the initial iSV images (ISV0 images) are obtained as close in time as possible to the reference images and with the subject positioned in the same way as in the reference images so surfaces extracted from the reference images will correspond with surfaces extracted from the iSV0 images. In other embodiments where movement of the subject may occur between the iSV0 and reference images, an initial registration 220 is performed. During this initial registration, after the mechanical model is extracted from the reference images and a mechanical model surface extracted therefrom, the mechanical model surface is registered to a surface extracted from the iSV0 images and the mechanical model is adjusted for any subject movement; the adjusted mechanical model (AMM) is used for further tracking and may optionally be displayed and inspected as described herein.

Figure 3A:
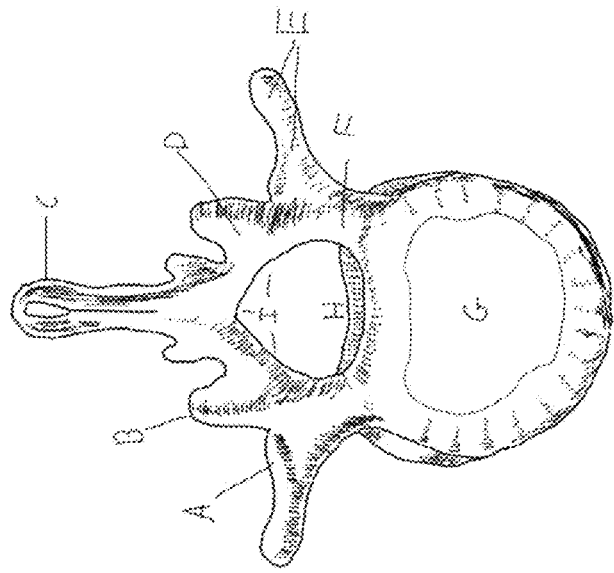
FIG. 3A is a schematic illustration of landmarks on a vertebra that may be visible in stereo images and that may be useful in 3-D surface model extraction and registration of an extracted 3D surface model to reference images or prior-stage surface models.
Figure 3C:
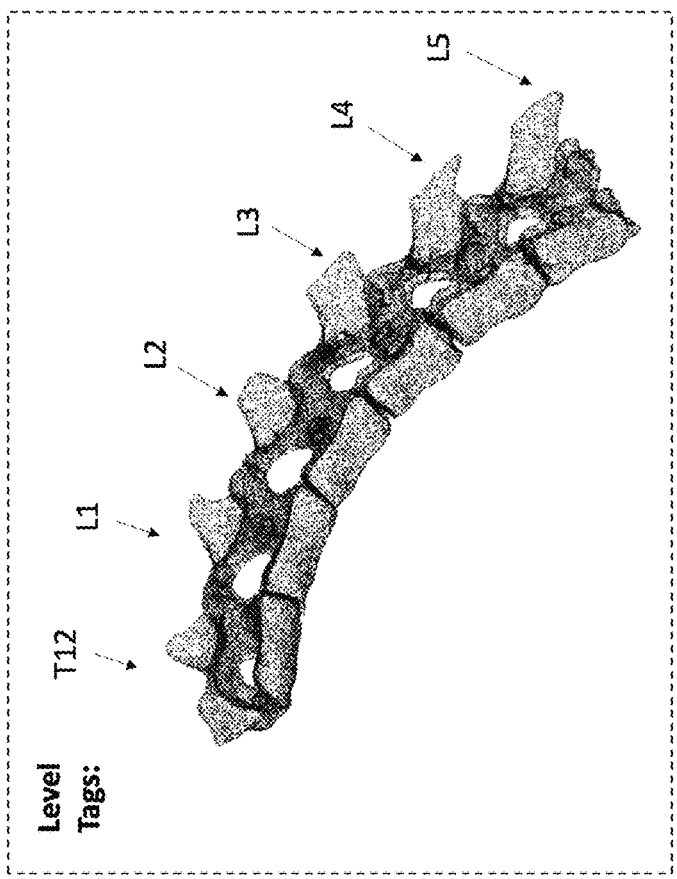
FIG. 3C is an illustration of a 3-D point cloud extracted from a mechanical model of the spine.
Figure 3B:
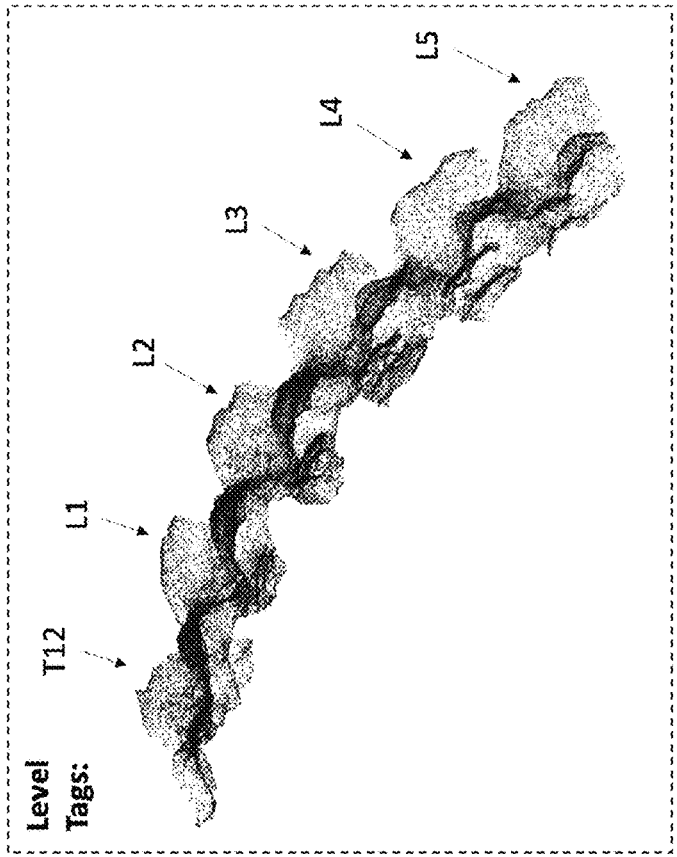
FIG. 3B is an illustration of a 3-D point cloud extracted from iSV images of the spine.

Some landmark points on a vertebra that may be visible in intraoperative stereo images (iSV) and may be useful in 3-D model extraction and registration of an extracted iSV 3D surface model to surfaces extracted from the 3D mechanical model or for registration of newly extracted iSV models to prior-stage iSV surface models are illustrated as A-E on FIG. 3A, or H if surgery is performed taking an anterior surgical approach. FIG. 3B illustrates a 3D point cloud as it may appear as extracted from an iSV image after labeling, and FIG. 3C represents labeled surfaces as they may be extracted from a mechanical model or adjusted mechanical model.

We note that reference image processor 132 may in some embodiments be the same processor as surgery-time or run-time image processor 124, and in other embodiments may be a different processor, and memory 125 used by the run-time image processor 124 may in some embodiments be a common memory with memory 135.

The iSV Images are Labeled 512.

In a first pass, in some embodiments a user may manually label 214 specific vertebrae in the stereoscopic imaging iSV-0 images to identify a corresponding tagged vertebra in the mechanical model 140 of the spine; in other embodiments even initial labeling is automatic and, in some embodiments, relies on a process similar to that of Pointnet's (trademark of Stanford University, Palo Alto, California) deep learning module. Run-time image processor 124 then identifies corresponding features of the iSV stereo images and extracts 216 a point cloud and a three-dimensional surface model 128 514 from the 3D images. In an alternative embodiment where fiducials are visible in both the reference images and the stereo images, the fiducials are recognized in the stereoscopic imaging so they can be matched to the same fiducials as seen in the reference imaging. If the subject is positioned in the same way in both reference and iSV0 images, the reference labels 138 may be copied to the initial iSV0 labels 129 and in some embodiments may be refined.

PointNet is a deep learning model for processing point cloud data used in 3D computer vision tasks such as object classification and segmentation. One way to use a PointNet model is to train it on a dataset of 3D point cloud data for a specific task, such as object recognition in a self-driving car application. Once the model is trained, it can be used to classify or segment new point cloud data in real-time. Another way to use a PointNet model is to fine-tune it on a new dataset or task using transfer learning.

Whether manually entered, or automatically generated, iSV tags 129 serve to label the vertebrae in the iSV images.

Mechanical Model Surface and ISV0 Surface Model Registration

After extracting the three-dimensional surface model from iSV0 images 128, 514, run-time image processor 124 identifies features of the three-dimensional surface model 128 derived from the iSV0 images and corresponding surface features extracted from the mechanical model, and registers 220 surface features of the mechanical model to the surface features of the iSV0 three-dimensional surface model 128 while deforming the mechanical model as appropriate for a close match. In embodiments where fiducials are visible in both the reference and stereo imaging, the fiducials are used to help identify corresponding features of the three-dimensional surface model and the mechanical model.

We note that the mechanical model models each vertebra as a separate rigid unit, these rigid units are not allowed to deform but are allowed to move relative to each other during registration as the mechanical model surface is fit to the iSV0 three-dimensional surface model; this moving during registration is particularly important as the mechanical model becomes an adjusted mechanical model (AMM) during initial (AMM0) and subsequent iterations (AMM(n)) of stereo imaging and registration. In a particular embodiment, we input the AMM into a neural network or statistical model with iSV surface data and reference images to predict and generate the position of a deformed, adjusted, CT-like model (uCT) that resembles an intraoperative CT without requiring additional radiation exposure.

iSV Acquisition

In embodiments, the iSV images may include a single birds-eye view of the entire exposed spine in one image if the stereo imaging unit 102 has an adequate view of the surgical field. In alternative embodiments, the iSV images include one or more images per level of interest for every level of the exposed spine that will be tracked by modeling, and in other embodiments the iSV images include multiple images each of multiple levels of vertebrae of interest; In many embodiments where multiple images are obtained the image processor stitches the images into composite images prior to extracting point clouds and iSV surface models during processing. In any of these embodiments, the iSV may be a video feed where images used are individual images from the feed or may be still images captured at timepoints of interest.

Where stitching is performed in embodiments having trackers 108, iSV surfaces acquired from a tracked stereovision system are mapped into the same coordinate system and the surfaces can be directly combined as a larger point cloud with no texture. To avoid overlapping regions between iSV surfaces producing overly sampled points we create a uniformed sampled composite surface through sequential stitching mechanism by resampling overlapping regions between each iSV surface on a common grid, and points in the overlapping regions are averaged. One of the two texture maps (either from the surface to be stitched, or the latest composite surface) is used as the texture map for the overlapping region. Non-overlapping regions are directly appended. Through this mechanism, iSV surfaces are concatenated and re-sampled to form a uniform sampling of the surface profile, instead of directly combined.

When stitching is performed in embodiments lacking trackers 108, or where tracking information is unused where there are overlapping regions between neighboring images, the iSV texture maps are registered using a feature matching algorithm such as optical flow, or SIFT/scale invariant feature transforms.

Labeling

Labeling is performed after extraction of point clouds from each set of intraoperative stereovision images (iSV or iSV(n)) and before registration between iSV(n) to iSV(n−1) or iSV0 and the mechanical model derived from reference imaging.

The labeling module receives the surface information of the exposed spine. The labeling module would divide this surface information such that points in the 3D point cloud surface data belonging to each vertebra are grouped together until an extent of the spine surface is covered.

Labeling involves level identification: within an iSV surface, image, or point cloud-spinal level or levels within the image are identified and labeled with their corresponding hierarchy within the spine, such as L5 for the $5^{th}$ or lowest lumbar vertebra or T12 for the $12^{th}$ or lowest thoracic vertebra. Labeling also involves segmentation: segmentation refers to dividing the iSV surface, image, or point cloud into multiple segments or regions, each representing features corresponding to a particular vertebral level.

The goal of labeling is that surface information captured (either in a stereovision image pair format or in a 3D point cloud format) corresponds to individual vertebral levels of the spine. Each vertebral level is made up of bones treated approximately as a rigid body. Therefore, movement of the spine between a position time_n−1 and a position time_n can be thought of as a rigid rotation and translation of vertebral levels. In an example where L4 and L5 lower lumbar vertebral levels and sacrum are exposed, the L5 level surface is treated as rigid but may move relative to the L4 and sacrum level surfaces.

By labeling the surface information corresponding to each individual vertebral level, we account for motion that might occur for this vertebral level between different positions, spine poses, and data acquisitions. This labeling module enables a very simplistic registration procedure between corresponding levels as described in the registration module such as a registration between surface information of a particular vertebra in position time_0 and information in position time_1.

Labeling of 3D surface information into levels could be achieved in several ways, although the iSV0 labeling may be partially manual while later passes iSV(n) are automated so that spinal displacements may be monitored in real time during surgery.

In some embodiments semantic segmentation is deep learning that involves assigning a semantic label to each pixel in an image. Deep learning models, such as fully convolutional neural networks (FCN), have been effectively used for semantic segmentation. These models typically take an image as input and output a segmentation map, where each pixel is assigned a label indicating an object class it belongs to. One popular architecture for semantic segmentation is U-Net, which is a fully convolutional neural network that combines a contracting path (down sampling) and a symmetric expanding path (up sampling). U-net has been widely used in biomedical image segmentation. Another popular architecture for semantic segmentation is DeepLab, which extends the FCN architecture with atrous convolution, which allows the network to efficiently process images at multiple scales. There are also many pre-trained models such as EfficientNet, ResNet, and DenseNet which can be fine-tuned for semantic segmentation tasks. Overall, semantic segmentation is a challenging task, but deep learning models have achieved state-of-the-art performance on many benchmark datasets.

Initial Labeling iSV0:

iSV0 data acquisition is our first stereovision dataset acquired after intraoperative exposure of the spine and performance of iCT (if any), this is time 0. This procedure includes:

First reference imaging is labeled level by level. In embodiments, this may be a manual labeling where a user specifies each label and draws on a GUI to specify each vertebra, a semi-automatic labeling where the user specifies a general region on reference images of the level of interest and image processing techniques automatically label the rest, or a fully automatic method could be used such as a deep learning approach like PointNet.

Labeling of iSV0 is performed by first performing an initial registration between the iSV surface and a surface derived from the mechanical model database, which in embodiments is performed with one or more of manual guidance, fiducial guidance, and a best pattern match. We also segment the iSV0 surface into vertebral portions based on bony landmarks.

To label each vertebral portion of the iSV0 surface as an individual vertebral level, in an embodiment we look at the closest points on the iSV point cloud to the most recently co-registered iCT surface. Those iSV points that are closest (within a threshold) to the bone of each labeled vertebra are labeled accordingly. By doing this the iSV point cloud and surfaces is reduced to mostly include only bone surface.

We extract from the iSV0 images a point cloud for each level that only contains the exposed bone surface, and generate a mask that contains the bone surface projected onto the 2D iSV0 image or surface to help guide segmentations of later iSV(n) point clouds.

Labeling iSV(n)

As surgery proceeds and subsequent frames of iSV(n) are captured 228, 516, stitched as necessary 518, and processed to extract point clouds, segmenting and labeling 520 is repeated either semi-automatically or completely automatically and iSV surface model extraction 522, 234 is repeated. The semi, and automatic methods may be mixed and matched for many embodiments of level identification and segmentation. This Time-n labeling procedure is used throughout the rest of the procedure; it includes:

1. Extracting from the iSV(n) images a point cloud for each level that contains bone surface.
2. Updating a mask that contains the bone surface projected onto the 2D iSV(n) image or surface and used to apply segmentations to later iSV(n+1) point clouds.
3. Segmenting 230 the iSV(n) surface according to vertebral level.
4. Labeling 232 the point cloud and surface portion associated with each vertebral level with identification of the vertebral level. And
5. Features, such as fiducials, screws, and bony landmarks, are identified 236 in the surface portion associated with each level.

The labeling module produces a set of surface data (3D point clouds) that represent separate vertebral levels (L1 surface point cloud vs. L2 surface point cloud vs T5 surface point cloud etc.) with features identified in each segment.

TABLE 1

Time-0 Labeling

| Input: single, whole spine iSV surface | Manual | Semi-automatic | Automatic |
| --- | --- | --- | --- |
| Level identification | User input | User specifies a reference level, and all other levels are automatically generated | Each level automatically identified using algorithm such as PointNet++ deep learning module Or Using known distances of levels |
| segmentation | User input to draw contours of region of interest | Using some initial input from user (contour) and image processing algorithms refine Or Automatically generates rough contours and user selects or refines | Multi staged PointNet++: one to get bone surface One to then divide bone surface into individual levels Or Semantic segmentation can be utilized to get the bone surface and then passed to point Net |

TABLE 2

| Time N > 0 (After Time-0) Labeling | | | |
|---|---|---|---|
| Input: many, individual level iSV surfaces | Manual | Semi-automatic | Automatic |
| Level identification | User input | User specifies a reference level, and all other levels are automatically generated Or Specifying the order of single snapshot corresponds | Using known distances of levels |
| Segmentation | User input to draw contours of region of interest | Using some initial input from user (contour) and image processing algorithms refine Or Automatically generates rough contours and user selects or refines | PointNet++: one to get bone surface Semantic segmentation can be utilized to get the bone surface | iSV(n) to iSV(n−1) Registration

The identified features of each segment of the new iSV(n) surfaces are then registered 238 to corresponding features of the prior iSV(n−1) (which may be iSV0 if n=1) stereovision images. Discrepancies in position of these features are noted, and a formula derived from indicating how vertebrae have shifted relative to their prior positions. The initial mechanical model or the prior adjusted mechanical model (AMM(n−1)) is then adjusted according to how vertebrae shifted relative to their prior positions to generate a new adjusted mechanical model AMM(n).

Using Adjusted Mechanical Models

Once each new adjusted mechanical model AMM(n) is prepared, tomographic images of the AMM(n) may in some embodiments be rendered 222, 240 and provided to a user to allow visualization of intrasurgical positioning of the spinal column including viewing alignment of spinal cord and spinal nerve passages. In a particular embodiment, alignment of spinal cord passages between vertebrae and space for spinal nerves to exit between vertebrae is automatically evaluated against criteria and surgeons alerted if poor alignment or inadequate space exists. In other embodiments, the mechanical model is rendered as known in the art of 3D computer graphics and displayed. In alternative embodiments the mechanical model is analyzed to determine degree of curvature in lordosis, kyphosis, and scoliosis and compared to degrees of curvature in either pCT images or known numbers in preoperative reports; in some embodiments determined degrees of curvature are compared against target curvature or other targets set for each case by a user. In other embodiments additional measures may be used. In some embodiments, space of the neural channel of vertebrae as aligned is computed and compared against limits to verify that realignment of vertebrae has not produced undesirable spinal stenosis. In some embodiments, reference images are warped 224, with image shapes representing bony parts like vertebrae constrained from deformation, until the bony parts correspond to the adjusted mechanical model, and these warped images may be displayed to the user.

Figure 4A:
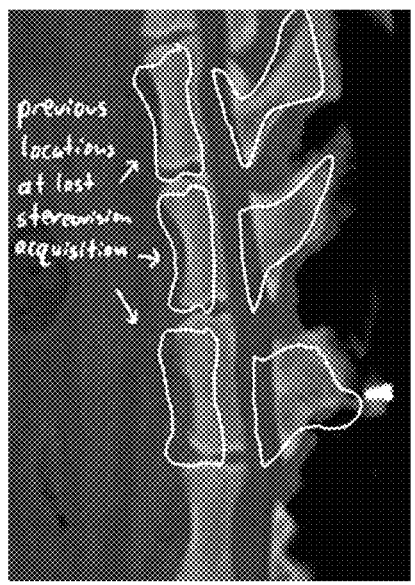
FIG. 4A and FIG. 4B represent superpositions of a possible pre-surgical alignment and an intraoperative or post-surgical alignment of vertebrae, without showing instrumentation.
Figure 4B:
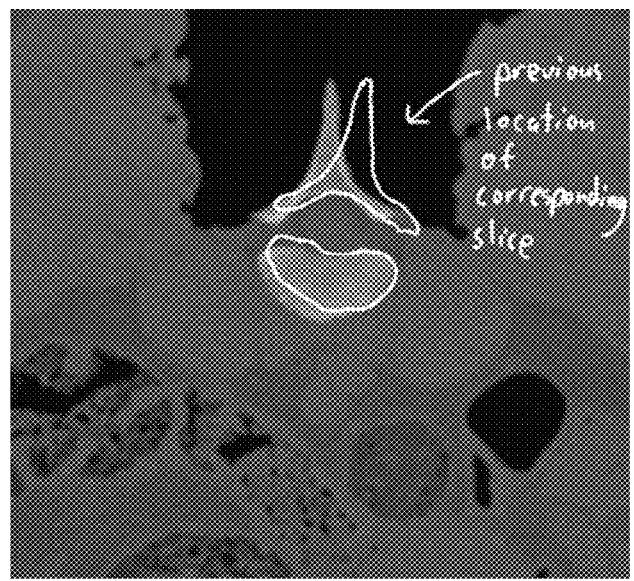

In a particular embodiment, representations of vertebrae as determined from reference images and as extracted from the adjusted mechanical model aligned to the current iSV surface are superimposed and displayed. Examples of such superimposed images are illustrated in FIGS. 4A and 4B.

Any hardware, such as pedicle screws, which has been attached immovably to bone and visible in the stereoscopic images is in some embodiments added to the mechanical model as a landmark for use in further stages of re-registration. Hardware, such as pedicle screws, visible in stereoscopic images may also be used in analysis and measurements as described above.

Steps of obtaining 212 and stitching stereoscopic imaging and extracting 216 a three-dimensional model are repeated to form each new surface model, with features of the stereo images recognized from the first pass registration so in many embodiments manual labeling 214 need not be repeated. The mechanical model as deformed previously during registration 220 is then further deformed to correspond to the new surface model during re-registration 220, and further images may be generated therefrom. This process repeats whenever a user requests and uses stereo camera 102 to image the exposed spine and spinous ligaments or at a predetermined rate subsampled from a video feed; in an alternative embodiment with an overhead stereo camera giving a continuous view of the surgical field of interest, the process repeats automatically throughout surgery and automated alarms are provided whenever vertebral alignment threatens compression of the spinal cord. In another alternative embodiment, the stereo imager includes one or more cameras mounted on a robotic arm that can position the cameras in desired positions.

In some embodiments, a previous stereovision extracted surface model (say T=0) is registered 524 to a current stereovision extracted surface model (say T=1) and differences between the two are highlighted and displayed to a user as described in "registration across times" below In an embodiment, registering the mechanical model to a newly acquired, stereovision-extracted surface model is performed by first registering a previous stereovision-extracted surface model to the newly acquired stereovision-acquired surface model while logging differences, then using these logged differences to update the mechanical model position.

Registration iSV(n) to iSV(n−1) or iSV(n−m)

The across time registration procedure is not tied to one algorithm. One algorithm experimented with is iterative closest point; however, other algorithms could be used. The general goal is to register each new iSV(n) to the iSV and adjusted mechanical model of prior sample times.

The registration module registers
1. a single labeled level from position time_N (i.e., level L3 from position time_1) to
2. the same labeled level from a previous position time_N−1 (i.e., level L3 from position time_0).

for each respective level in the data set of the exposed segment exposed and imaged with the stereovision system If Data Acquisition is Done in on Demand Snapshots:

This registration process is repeated between every corresponding level of subsequent spine-position datasets—this can be called a level-wise registration. For example, between the data acquired at the start of the surgery—spine position time_0 can be registered to data acquired at a later time time_1. When data is next acquired, for example at time_2, registration is performed between the level-wise pairs. For example, by knowing the correspondence/transformations between data at position time_0 and position time_1 AND knowing the correspondence/transformations between position time_1 and position time_2, we know the correspondence/transformations between position time_0 and position time_2.

If the data acquisition is done continuously, we know this correspondence for each acquisition frame whether this can be performed at the frame rate of the video feed or on some acquisition speed that is a fraction of the frame rate to sub-sample the video feed.

Existing methods include Iterative Closest Point (ICP) and Coherent Drift (CD).

For example, if Point Cloud A (T8 in spine position time_0) is being registered to the Point Cloud B (T8 in spine position time_1), these two data sets could be in very different positions depending on the duration of time that has passed between time point 1 and time point 0. Nevertheless, the point clouds should represent the same structures.

We typically assume a rigid transformation between Point Cloud A and Point Cloud B because the structure of each vertebra is rigid.

Motion Tracking

Motion tracking from one time, such as T=2 to T=1, is performed as follows:

When registering two point clouds—point cloud A and point cloud B—a 4 by 4 matrix is being solved for. This 4 by 4 matrix describes the rotation and translation that needs to be applied to point cloud B to approximately align point cloud B with point cloud A Two sets of points or point clouds can be given by:

$$P_A = \begin{bmatrix} x_1 & x_2 & x_3 & \cdots & x_n \\ y_1 & y_2 & y_3 & \cdots & y_n \\ z_1 & z_2 & z_3 & & z_n \\ 1 & 1 & 1 & & 1 \end{bmatrix} P_B = \begin{bmatrix} x_1 & x_2 & x_3 & \cdots & x_m \\ y_1 & y_2 & y_3 & \cdots & y_m \\ z_1 & z_2 & z_3 & & z_m \\ 1 & 1 & 1 & & 1 \end{bmatrix}$$

where n may not be the same as m. In this case a transform can be solved for that minimizes the misalignment between point cloud B and point cloud A. This transform is T and applying it to point cloud B provides a new set of points or point cloud B'

$$P_{B'} = T \cdot P_B$$

Where point cloud B' closely overlaps with point cloud A minimizing the error or distance between the two. The transform T that puts the point cloud B into a close approximation of point cloud A is described by:

$$T = \begin{bmatrix} R_{11} & R_{12} & R_{13} & \Delta x \\ R_{21} & R_{22} & R_{23} & \Delta y \\ R_{31} & R_{32} & R_{33} & \Delta z \\ 0 & 0 & 0 & 1 \end{bmatrix}$$

the R values constitute rotation components about the x, y, z axis whereas delta x, delta y, delta z are translations.

What this means is that If, we have point clouds, Point cloud A and Point cloud B that correspond to the same vertebral level, we can perform a registration to obtain the 4 by 4 transformation T_b_to_a. We then now know exactly how to move point cloud B such that it overlaps the position of point cloud A and the distance between the two has been minimized.

If point cloud A is the position of the L1 at time_n−1 and point cloud B is the position of L1 at time_n. We now know the approximate displacement and rotation that has occurred over the time period t=(time_n−time_(n−1)). Doing this for each labeled level allows us to perform level-wise motion tracking between and across time.

The T_b_to_a we obtain is used in various ways as described below.

1) Enablement Navigation

Generating an Updated CT Imaging Stack

We can generate an updated CT. The updated CT image stack generated by performing motion tracking up to time point t_n+1 (as described above) would look equivalent to collecting an intraoperative CT at time point t_n+1 with much less radiation exposure to the subject than if another iCT were acquired.

This updated CT can be used as a new image stack that is co-registered to prior scans and instrumentation in the field of view. Using the same navigation system for tracking instruments and stereovision images, the updated CT at time point_n+1 can be used for continued and now more accurate navigation after motion has occurred in the spine.

2) Update the Navigation Transformation

We can do single level registration of spine surfaces for navigation due to the movement we are trying to account for. Instead of updating the images, we can update the navigation transformation for the level currently being instrumented to match the stereovision surface.

Each level's transformation would be stored based on its corresponding iSV surface location. When a surgeon wants to instrument a particular level, he or she could specify which and the level-specific transform would be applied to ensure navigation is accurate and matches iSV surface positioning.

Once motion has been tracked and the uCT mechanical model updated 524 to best match the latest iSV, we can show a 3D view of just the spinal bones in a graphical user interface with a user permitted to toggle between time datasets to see the motion during surgery or correction occurring from surgery. We can also overlay new positions onto previous CT image stacks to visualize in sagittal, coronal, and axial views the motion or disc placement that has occurred for the bone We note that there is a natural curvature to the spine with what is known as normal ranges of kyphosis and lordosis. When patients have kyphosis or lordosis outside of these normal ranges it can be problematic and painful for the patient. In many types of spine surgery, the surgeon is interested in how the spine has moved during surgery and how current positions compare to an ideal spine curvature. A few scenarios are described below:

Motion resulting from the insertion of instruments such as an interbody cage into the intervertebral disc space: for spinal fusion surgery oftentimes an intervertebral cage or implant is inserted between levels of the spine. The size of these is typically chosen to restore disc height or distance between vertebral levels. The surgeon is interested in:
  a. the degree of height restoration
  b. How the implant affects curvature of adjacent levels and the spine as a whole.

Motion that is induced by the surgeon to perform correction: spinal deformity can range in severity and often surgical intervention is required to restore the curvature of the spine to a more normal position. This is expected to be a primary use of this technology. Currently, in large multi-level scoliosis cases, there is no easy way to determine the true extent of correction that has been made to the spine until postoperatively when the patient is standing up and has a full body chest x-ray—at this point it is generally too late to make revisions to the correction. In addition to allowing surgeons to visualize motion as described in the previous section, we can allow them to make standard measurements from the mechanical model as adjusted to correspond to the iSV images, and in some embodiments, we can automatically make these measurements. These measurements include the Cobb angle useful for diagnosis of scoliosis. We can also compare an initial T=0 spinal position to a current or final spinal position. Either manual or automatic measurements provide a surgeon useful information to the degree of correction.

In embodiments, vertebral transverse processes are recognized through the supraspinous ligament, and in embodiments interspinous ligaments are recognized as features demarcating vertebrae in the three-dimensional surface model 128.

In embodiments, trackable stereo camera 102 is tracked by run-time image processor 124 and tracked position and angle of trackable stereo camera 102 is used to assist stitching of stereoscopic images and in re-registrations.

In some embodiments where the stereo imager is equipped with trackers, location and positioning of the patient or subject is tracked with an additional tracker to aid registration and re-registration of CT and MRI images to the extracted surface model, and to better allow use of the mechanical model to aid surgical navigation during surgery by allowing the surgeon to determine exactly where to place hardware in bone of vertebrae.

Combinations

Applicants anticipate the various components of the system and method described herein can be combined in various ways. Among those ways Applicants anticipate are:

An intraoperative stereovision system designated A including a stereo imager configured to provide first stereo images at a first time and to provide second stereo images at a second time to an image processor, the second time after the first time. The image processor being configured with a computerized mechanical model of a spinal column, the computerized mechanical model configured to model vertebrae as rigid, displaceable, bodies, the computerized mechanical model configured to model vertebral positions at the first time; code configured to extract a first surface model from the first stereo images; code configured to extract a second surface model from the second stereo images; code configured to register the second surface model to the first surface model and to determine differences between the second surface model and the first surface model at vertebral levels; and code configured to adjust the computerized mechanical model according to the differences between the second surface model and the first surface model to prepare an adjusted mechanical model by deforming the computerized mechanical model.

An intraoperative stereovision system designated AA including the intraoperative stereovision system designated A and further including code configured to derive the computerized mechanical model of a spinal column from computerized X-ray tomography (CT) images or magnetic resonance imaging (MRI) images.

An intraoperative stereovision system designated AB including the intraoperative stereovision system designated A or AA and further including further comprising code configured to register surfaces derived from the first stereo images to surfaces derived from the computerized mechanical model, and to adjust the computerized mechanical model according to differences between the surfaces derived from the first stereo images and the surfaces derived from the computerized mechanical model.

An intraoperative stereovision system designated AC including the intraoperative stereovision system designated A, AA, or AB and further including code configured to stitch multiple stereo images into the first and second stereo images to cover an entire exposed region.

An intraoperative stereovision system designated AD including the intraoperative stereovision system designated A, AA, AB, or AC and further including code to segment the first and second surface models according to vertebral levels.

An intraoperative stereovision system designated AE including the intraoperative stereovision system designated A, AA, AB, AC or AD and further including code configured to render tomographic images of the adjusted computerized mechanical model.

An intraoperative stereovision system designated AF including the intraoperative stereovision system designated A, AA, AB, AC, AD, or AE and further including code configured to warp computerized X-ray tomography (CT) images or magnetic resonance imaging (MRI) images according to displacement between the computerized mechanical model and the adjusted computerized mechanical model.

An intraoperative stereovision system designated AG including the intraoperative stereovision system designated A, AA, AB, AC, AD, AE, or AF and further configured to evaluate alignment of spinal cord passages between vertebrae and space for spinal nerves to exit between vertebrae against criteria to determine if poor alignment or inadequate space exists.

An intraoperative stereovision system designated AH including the intraoperative stereovision system designated A, AA, AB, AC, AD, AE, AF, or AG and further including code to provide spinal angle measurements of kyphosis, lordosis, and scoliosis and to compare these measurements to presurgical measurements or to targets set by a user.

A method designated B of monitoring spinal surgery including obtaining first stereo images at a first time and second stereo images at a second time the second time after the first time, the stereo images of an intraoperatively exposed surface of a spine; extracting a first surface model from the first stereo images; extracting a second surface model from the second stereo images; registering the second surface model to the first surface model and determining differences between the second surface model and the first surface model at vertebral levels; and adjusting a computerized mechanical model of vertebrae of the spine according to the differences between the second surface model and the first surface model to prepare an adjusted mechanical model by deforming the computerized mechanical model; where the computerized mechanical model models vertebrae as rigid, displaceable, bodies, the computerized mechanical model initially configured to model vertebral positions at the first time.

A method designated BA including the method designated B further including deriving the computerized mechanical model of a spinal column from computerized X-ray tomography (CT) images or magnetic resonance imaging (MRI) images.

A method designated BB including the method designated BA or B and further including registering surfaces derived from the first stereo images to surfaces derived from the computerized mechanical model and adjusting the computerized mechanical model according to differences between the surfaces derived from the first stereo images and the surfaces derived from the computerized mechanical model.

A method designated BC including the method designated BB, BA or B and further including stitching multiple stereo images into each of the first and second stereo images to cover an entire exposed region.

A method designated BD including the method designated BC, BB, BA or B and further including segmenting the first and second surface models according to vertebral levels.

A method designated BE including the method designated BD, BC, BB, BA or B and further including rendering tomographic images of the computerized mechanical model.

A method designated BF including the method designated BE, BC, BB, BA or B and further including, further warping computerized X-ray tomography (CT) images or magnetic resonance imaging (MRI) images according to displacement between the original computerized mechanical model and the adjusted computerized mechanical model.

A method designated BG including the method designated BF, BE, BD, BC, BB, BA or B and further including evaluating alignment of spinal cord passages between vertebrae and space for spinal nerves to exit between vertebrae against criteria to determine if poor alignment or inadequate space exists.

A method designated BH including the method designated BG, BF, BE, BD, BC, BB, BA or B and further including providing spinal angle measurements of kyphosis, lordosis, and scoliosis and to compare these measurements to presurgical measurements or to targets set by a user.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An intraoperative stereovision system comprising:
   a stereo imager configured to provide first stereo images at a first time and to provide second stereo images at a second time to a processor, the second time after the first time;
   a computerized mechanical model of a spinal column, the computerized mechanical model modeling vertebrae as rigid, displaceable, bodies, and modeling vertebral positions at the first time; and
   code in a memory that causes the processor to:
      extract a first surface model from the first stereo images;
      extract a second surface model from the second stereo images;
      register the second surface model to the first surface model;
      determine differences between the second surface model and the first surface model at vertebral levels;
      prepare an adjusted computerized mechanical model by deforming the computerized mechanical model according to the differences; and
      using the adjusted computerized mechanical model, evaluate alignment of spinal cord passages between vertebrae and space for spinal nerves to exit between vertebrae against criteria to determine if poor alignment or inadequate space exists.

2. The intraoperative stereovision system of claim 1 further comprising code in the memory configured to cause the processor to derive the computerized mechanical model of a spinal column from computerized X-ray tomography (CT) images or magnetic resonance imaging (MRI) images.

3. The intraoperative stereovision system of claim 1 further comprising code in the memory configured to cause the processor to stitch multiple stereo images into the first and second stereo images to cover an entire exposed region.

4. The intraoperative stereovision system of claim 1 further comprising code in the memory to cause the processor to segment the first and second surface models according to vertebral levels.

5. The intraoperative stereovision system of claim 1, the code further causing the processor to render tomographic images of the adjusted computerized mechanical model.

6. An intraoperative stereovision system comprising:
   a stereo imager configured to provide stereo images at a second time to a processor; and
   code in a memory that causes the processor to:
      derive an initial computerized mechanical model of a spinal column from computerized X-ray tomography (CT) images or magnetic resonance imaging (MRI) images, the initial computerized mechanical model modeling vertebrae as rigid, displaceable, bodies, and vertebral positions at a first time;
      extract a surface model from the stereo images;
      adjust the initial computerized mechanical model of the spinal column based on the surface model to form an adjusted computerized mechanical model of the spinal column at the second time; and
      warp the computerized X-ray tomography (CT) images or the magnetic resonance imaging (MRI) images according to displacement between the initial computerized mechanical model and the adjusted computerized mechanical model.

7. The intraoperative stereovision system of claim 6, further comprising code configured to cause the processor to render tomographic images of the adjusted computerized mechanical model.

8. A method of monitoring spinal surgery comprising:
   obtaining first stereo images at a first time and second stereo images at a second time the second time after the first time, the stereo images of an intraoperatively exposed surface of a spine;
   extracting a first surface model from the first stereo images;
   extracting a second surface model from the second stereo images;

registering the second surface model to the first surface model;

determining differences between the second surface model and the first surface model at vertebral levels;

using an initial computerized mechanical model of a spinal column derived from computerized X-ray tomography (CT) images or magnetic resonance imaging (MRI) images, preparing a first adjusted computerized mechanical model by deforming the initial computerized mechanical model of a spinal column according the first surface model, the initial computerized mechanical model of the spinal column modeling vertebrae as rigid, displaceable, bodies;

preparing a second adjusted computerized mechanical model by adjusting the first adjusted computerized mechanical model based on the differences; and using the second adjusted computerized mechanical model, evaluating alignment of spinal cord passages between vertebrae and space for spinal nerves to exit between vertebrae against criteria to determine if poor alignment or inadequate space exists.

9. The method of claim 8 further comprising stitching multiple stereo images into each of the first and second stereo images to cover an entire exposed region.

10. The method of claim 9 further comprising segmenting the first and second surface models according to vertebral levels.

11. The method of claim 8, further comprising rendering tomographic images of the second adjusted computerized mechanical model.

12. The method of claim 8, further comprising warping the computerized X-ray tomography (CT) images or the magnetic resonance imaging (MRI) images according to displacement between the initial computerized mechanical model and the adjusted computerized mechanical model.

13. The method of claim 8, further comprising warping computerized the X-ray tomography (CT) images or the magnetic resonance imaging (MRI) images according to displacement between the initial computerized mechanical model and the second adjusted computerized mechanical model.

14. The method of claim 8, further comprising determining spinal angle measurements of kyphosis, lordosis, and scoliosis, and comparing the spinal angle measurements to presurgical measurements or to targets set by a user.

15. The intraoperative stereovision system of claim 6, further comprising code configured to cause the processor to determine spinal angle measurements of kyphosis, lordosis, and scoliosis, and to compare the spinal angle measurements to presurgical measurements or to targets set by a user.

16. The intraoperative stereovision system of claim 1, further comprising code configured to cause the processor to determine spinal angle measurements of kyphosis, lordosis, and scoliosis, and to compare the spinal angle measurements to presurgical measurements or to targets set by a user.

* * * * *